US011379768B2

(12) United States Patent
Iwata et al.

(10) Patent No.: US 11,379,768 B2
(45) Date of Patent: Jul. 5, 2022

(54) DIALOGUE DATA COLLECTION SYSTEM AND DIALOGUE DATA COLLECTION SUPPORTING APPARATUS

(71) Applicant: KABUSHIKI KAISHA TOSHIBA, Tokyo (JP)

(72) Inventors: Kenji Iwata, Machida Tokyo (JP); Hisayoshi Nagae, Yokohama Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 448 days.

(21) Appl. No.: 15/433,634

(22) Filed: Feb. 15, 2017

(65) Prior Publication Data
US 2017/0161665 A1 Jun. 8, 2017

Related U.S. Application Data

(63) Continuation of application No. PCT/JP2015/058323, filed on Mar. 19, 2015.

(51) Int. Cl.
*G06Q 10/06* (2012.01)
*G06Q 50/10* (2012.01)
(Continued)

(52) U.S. Cl.
CPC ......... *G06Q 10/06316* (2013.01); *G06Q 10/063114* (2013.01); *G06Q 50/10* (2013.01);
(Continued)

(58) Field of Classification Search
None
See application file for complete search history.

(56) References Cited

U.S. PATENT DOCUMENTS 8,095,371 B2 * 1/2012 Horioka ............... G10L 15/22
704/E15.04
9,697,822 B1 * 7/2017 Naik ................. G10L 15/22
(Continued)

FOREIGN PATENT DOCUMENTS

CN 105894186 A * 8/2016
JP 10333543 A 12/1998
(Continued)

OTHER PUBLICATIONS

Reference Quindere et al. (Quindere et al. Evaluation of a dialogue manager for a mobile robot. 2013 IEEE RO-MAN (pp. 126-132). Published in Aug. 1, 2013) (Year: 2013).*

(Continued)

*Primary Examiner* — Patricia H Munson
*Assistant Examiner* — Nancy N Prasad
(74) *Attorney, Agent, or Firm* — Holtz, Holtz & Volek PC

(57) ABSTRACT

According to an embodiment, a dialogue data collection system includes a presenter, a determiner, a notifier and a collector. The presenter receives response information that the dialogue management apparatus generates by advancing a dialogue status based on the spoken phrases, and presents the response information to the worker. The determiner compares the response information to one or more achievement conditions predetermined relative to the task, and determines achievement or non-achievement of the task based on whether or not the achievement conditions are satisfied. The notifier notifies the worker of achievement of the task. The collector collects dialogue data including the spoken phrase and the response information.

11 Claims, 7 Drawing Sheets

(51) Int. Cl.
*G10L 15/26* (2006.01)
*G10L 15/18* (2013.01)
*G10L 15/22* (2006.01)
*G10L 15/30* (2013.01)

(52) U.S. Cl.
CPC .......... *G10L 15/1815* (2013.01); *G10L 15/22* (2013.01); *G10L 15/26* (2013.01); *G10L 15/30* (2013.01); *G10L 2015/223* (2013.01)

(56) References Cited

U.S. PATENT DOCUMENTS

| | | |
|---|---|---|
| 2008/0082692 A1 | 4/2008 | Yano |
| 2008/0244594 A1* | 10/2008 | Chen .................. G06F 8/34 718/104 |
| 2011/0202439 A1* | 8/2011 | Ricci .................. G06Q 30/04 715/706 |
| 2012/0290509 A1 | 11/2012 | Heck et al. |
| 2014/0033071 A1* | 1/2014 | Gruber .............. G06Q 10/1097 715/752 |

FOREIGN PATENT DOCUMENTS

| | | |
|---|---|---|
| JP | 2000293194 A | 10/2000 |
| JP | 2003228449 A | 8/2003 |
| JP | 2007264199 A | 10/2007 |
| JP | 2008089729 A | 4/2008 |
| JP | 2009025518 A | 2/2009 |
| JP | 2014067098 A | 4/2014 |

OTHER PUBLICATIONS

International Search Report (ISR) and Written Opinion dated Jun. 2, 2015 issued in International Application No. PCT/JP2015/058323.
Hisayoshi Nagae et al., "Spoken Dialogue Technology to Understand Problems and Offer Solutions", Toshiba Review, vol. 68, No. 9, Sep. 1, 2013, pp. 14-17.

* cited by examiner

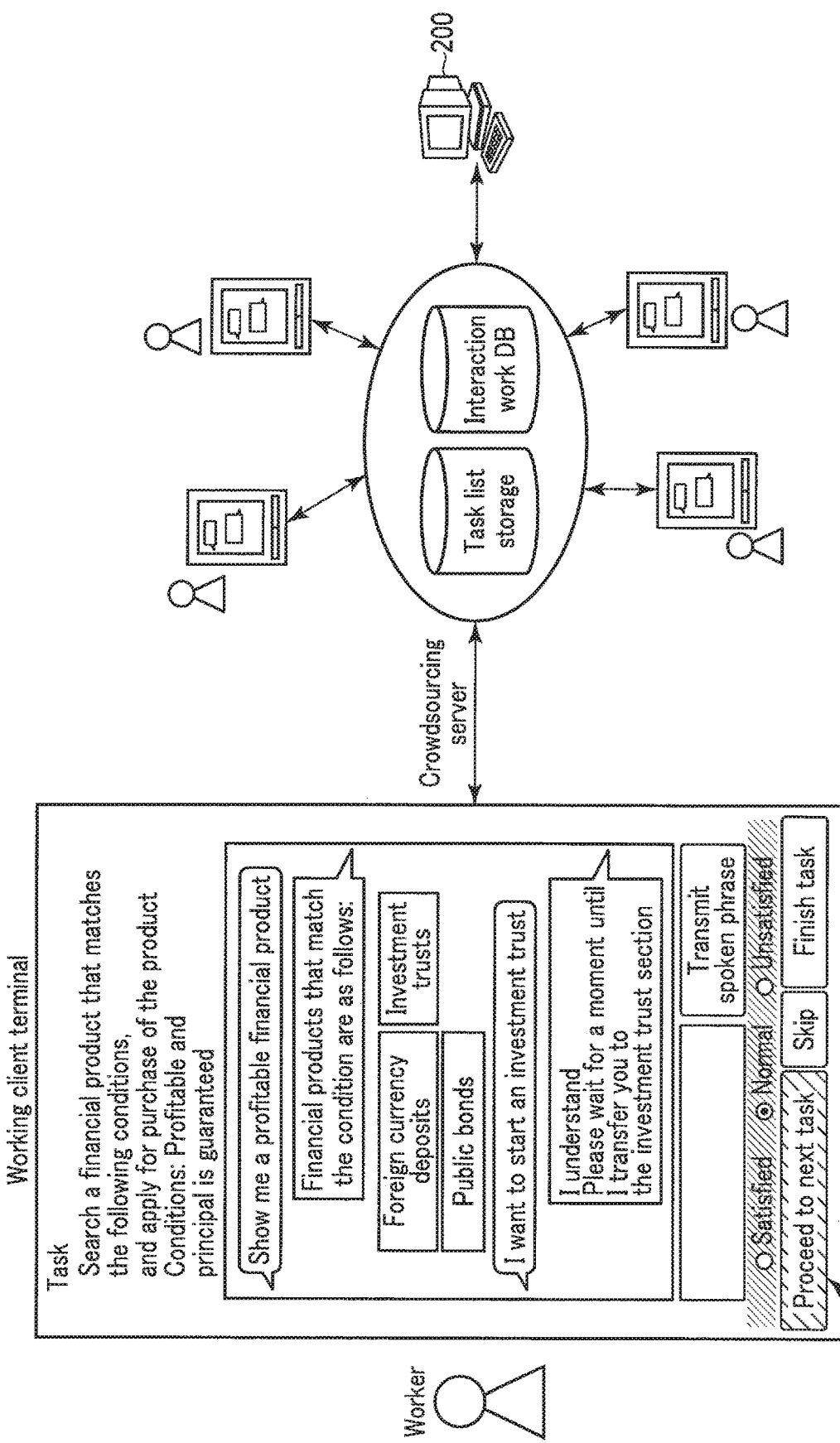

DIALOGUE DATA COLLECTION SYSTEM AND DIALOGUE DATA COLLECTION SUPPORTING APPARATUS

CROSS-REFERENCE TO RELATED APPLICATIONS

This application is a Continuation Application of PCT Application No. PCT/JP2015/058323, filed Mar. 19, 2015, the entire contents of which are incorporated herein by reference.

FIELD

Embodiments described herein relate generally to dialogue data collection.

BACKGROUND

Recently, dialogue systems using statistic models have been focused on. Creating statistic models requires a large amount of dialogue data for learning (for example, user utterances (spoken phrases), response information of dialogue systems, etc.).

Conventionally, dialogue data is collected through interaction between a dialogue system and a worker (a subject) summoned to a work site. The worker is given a task, and is required to input suitable spoken phrases to the dialogue system in order to complete the task. This method incurs costs for collecting workers and takes a long time to collect dialogue data. Accordingly, it is desirable to collect dialogue data efficiently.

Crowdsourcing has been known as a framework to outsource a task to an undefined public through a network such as the Internet. Using crowdsourcing eliminates a need for workers to physically move, and allows a crowd of workers to work at the same time, thereby enabling the collection of dialogue data at low cost and in a short time. However, in crowdsourcing, workers carry out the task without being observed. That is, workers are required to determine completion of a task based on the response information of the dialogue system, and to finish an interaction work relating to the task at their own discretion.

Under the circumstances, it may be possible that a worker finishes an interaction work when the worker has erroneously determined the task to be complete, or that a worker of ill intent inputs perfunctory spoken phrases unrelated to the task merely to finish the task in order to fraudulently collect a payment. It would be difficult to collect high quality dialogue data if such workers were to carry out such kind of interaction work. In addition, it may be possible that a worker continues an interaction work by erroneously determining that the task has not been completed even if the task has previously been completed. In this case, work efficiency may be decreased.

BRIEF DESCRIPTION OF THE DRAWINGS

FIG. 4A illustrates an operation example of the dialogue data collection system of FIG. 1.

DETAILED DESCRIPTION

Figure 1:
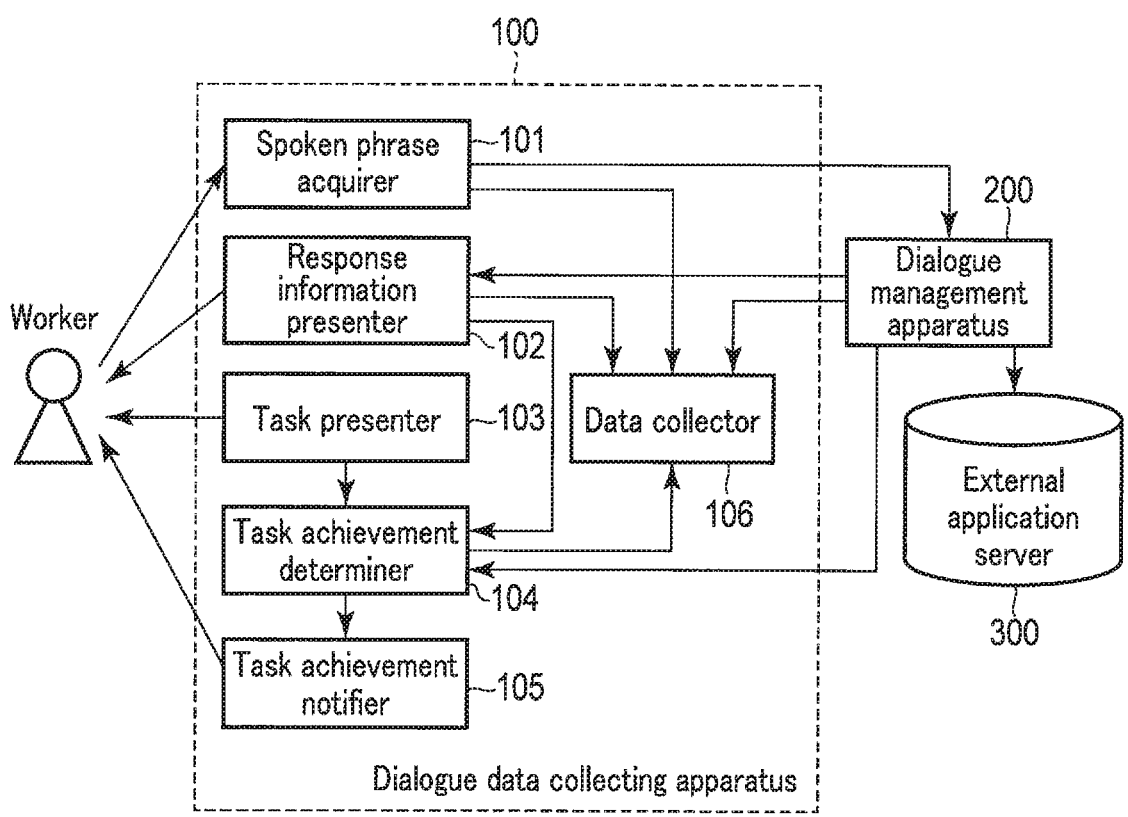
FIG. 1 is a block diagram showing a dialogue data collection system according to the first embodiment.

Embodiments will be described hereinafter with reference to drawings.

According to an embodiment, a dialogue data collection system includes a task presenter, an acquirer, a response information presenter, an achievement determiner, a notifier and a collector. The task presenter presents a task to a worker. The acquirer acquires a spoken phrase from the worker and provides the spoken phrase to a dialogue management apparatus. The response information presenter receives response information that the dialogue management apparatus generates by advancing a dialogue status based on the spoken phrases, and presents the response information to the worker. The achievement determiner compares the response information to one or more achievement conditions predetermined relative to the task, and determines achievement or non-achievement of the task based on whether or not the achievement conditions are satisfied. The notifier notifies the worker of achievement of the task. The collector collects dialogue data including the spoken phrase and the response information.

According to another embodiment, a dialogue data collection supporting apparatus includes a task presenter, an acquirer, a response information presenter, and a notifier. The task presenter presents a task to a worker. The acquirer acquires a spoken phrase from the worker and provides the spoken phrase to a dialogue management apparatus. The response information presenter receives response information that the dialogue management apparatus generates by advancing a dialogue status based on the spoken phrases, and presents the response information to the worker. The notifier notifies the worker of achievement of the task.

In the drawings, the same constituent elements are denoted by the same respective reference numbers, therefore redundant explanations will be omitted.

First Embodiment

As shown in FIG. 1, the dialogue data collection system according to the first embodiment includes a dialogue data collection apparatus 100, a dialogue management apparatus 200, and an external application server 300.

The dialogue data collection system shown in FIG. 1 collects dialogue data by allowing a worker to carry out an interaction work with a dialogue system on crowdsourcing for learning or evaluation of the dialogue system, especially the dialogue management apparatus 200. The dialogue data will be described in detail later.

The dialogue system is an information processing system that automatically advances a dialogue status in accordance with a user's spoken phrases, and ultimately provides a service matching user needs. The dialogue system may include the dialogue management apparatus 200 and peripheral devices (for example, a user interface, an external application server 300, etc.). For example, the dialogue system may correspond to a weather search system that searches for and provides weather information that a user needs, a financial product sales system that searches for and provides financial product information that a user needs, and receives an application for purchase, or a facility search system that searches for and provides facility information that a user needs.

The dialogue data collection apparatus 100 functions as an interface between a worker and the dialogue management apparatus 200. Specifically, the dialogue data collection apparatus 100 provides a worker with a task, receives a spoken phrase from the worker, provides the worker with response information received from the dialogue management apparatus 200, determines whether the task is achieved by the response information, and notifies the worker of achievement of the task if the task is achieved. On the other hand, the dialogue data collection apparatus 100 provides the spoken phrase acquired from the worker to the dialogue management apparatus 200, and receives response information generated at the dialogue management apparatus 200 based on the spoken phrase from the dialogue management apparatus 200. The dialogue data collection apparatus 100 collects and stores at least dialogue data which includes the spoken phrase and response information. The dialogue data may include a determination result as to whether or not a task is achieved, and an evaluation result of the dialogue system fed back from the worker.

The dialogue management apparatus 200 advances an interaction in accordance with the spoken phrase received from the dialogue data collection apparatus 100, generates response information, and returns the response information to the dialogue data collection apparatus 100. Generally, the dialogue management apparatus 200 may be functionally divided into a natural language understanding module, a dialogue management module, and a response generation module.

The natural language understanding module performs language processing to interpret an intention of the spoken phrase (speaker's intention). The dialogue management module controls an action of the dialogue system based on a natural language understanding result. Specifically, the dialogue management module transfers a dialogue status, and executes an external application provided by the external application server 300 connected to the dialogue management apparatus 200 through a network. The external application may be a weather search application, for example. The response generation module generates response information suitable to an action of the dialogue system controlled by the dialogue management module. The response generation module generates response information. The response information may be a response sentence suitable to a current dialogue status, or indicate an execution result of the external application, for example. The response information indicating an execution result of the external application may be information directly indicating the execution result (for example, weather search results), or information indirectly indicating the execution result (for example, a Uniform Resource Locator (URL) to access a Web page that indicates the execution result).

In the example of FIG. 1, the dialogue management apparatus 200 is independent from the dialogue data collection apparatus 100, and is connected to the dialogue data collection apparatus through a network. However, the dialogue management apparatus 200 may be embedded in the dialogue data collection apparatus 100.

The dialogue data collection apparatus 100 includes a spoken phrase acquirer 101 a response information presenter 102, a task presenter 103, a task achievement determiner 104, a task achievement not 105, and a data collector 106. The dialogue data collection apparatus 100 may correspond to a client terminal that a worker operates, or a crowdsourcing server connected to the client terminal through a network. Otherwise, the elements included in the dialogue data collection apparatus 100 may be separately embedded in the client terminal and the crowdsourcing server (not shown in FIG. 1).

The spoken phrase acquirer 101 acquires a spoken phrase of a worker in the form of text. The spoken phrase acquirer 101 may include an input device (for example, a keyboard, a mouse, and a software keyboard) to receive a text input from a worker, or combination of a microphone to receive a voice input from a worker and an automatic speech recognition (ASR) module to perform speech recognition to a voice received by the microphone. Otherwise, the spoken phrase acquirer 101 may include a receiver that receives a spoken phrase in the form of text data from the client terminal through a network. A worker is given a task as indicated later, and is required to input a suitable spoken phrase to the spoken phrase acquirer 101 in order to achieve the task.

The spoken phrase acquirer 101 provides the acquired spoken phrase to the dialogue management apparatus 200. If the dialogue management apparatus 200 is embedded in the dialogue data collection apparatus 100, the spoken phrase acquirer 101 can provide to the dialogue management apparatus 200 through a bus a spoken phrase which is the received spoken phrase. On the other hand, if the dialogue management apparatus 200 is not embedded in the dialogue data collection apparatus 100, the spoken phrase acquirer 101 may include a transmitter to transmit a spoken phrase to the dialogue management apparatus 200 through a network.

The response information presenter 102 receives response information from the dialogue management apparatus 200. If the dialogue management apparatus 200 is embedded in the dialogue data collection apparatus 100, the response information presenter 102 can receive response information from the dialogue management apparatus 200 through a bus. On the other hand, if the dialogue management apparatus 200 is not embedded in the dialogue data collection apparatus 100, the response information presenter 102 may include a receiver to receive response information from the dialogue management apparatus 200 through a network.

The response information presenter 102 presents response information to a worker. The response information presenter 102 may present the response information with or without processing it. The response information presenter 102 may include a display device to output response information to a screen, or a combination of a speech synthesis (Text-to-Speech: TTS) module to perform speech synthesis of response information that is in the form of text, and a speaker to output the response information in the form of speech generated by the speech synthesis module. Alternatively, the response information presenter 102 may also include a transmitter to transmit response information to the client terminal through a network.

In addition, the response information presenter 102 notifies the task achievement determiner 104 of the response information presented to a worker. That is, the response information presenter 102 directly or indirectly provides to the task achievement determiner 104 information indicating the response information. The response information may be notified to the task achievement determiner 104 from the dialogue management apparatus 200, instead of from the response information presenter 102.

A worker can provide an additional spoken phrase to the dialogue data collection apparatus 100, in consideration of the response information presented by the response information presenter 102. As stated above, the interaction proceeds by interchanging a spoken phrase of a worker and response information of the dialogue system.

The task presenter 103 extracts a task from a task list that includes a plurality of tasks that can be achieved by a suitable interaction performed between a worker and the dialogue system. The task presenter 103 presents the extracted task to a worker.

Specifically, the task presenter 103 presents a task such as "Search for the weather in the following place: Tokyo", in the case where the dialogue system corresponds to a weather search system. In the case where the dialogue system corresponds to a financial product sales system, the task presenter 103 presents a task such as "Search for a financial product that matches the following conditions, and apply for purchase of the product: Profitable, and principal is guaranteed". In the case where the dialogue system corresponds to a facility search system, the task presenter 103 presents a task such as "Search for an Italian restaurant".

The order of tasks to be extracted may be predetermined by a particular rule, or at random. A task list storage that stores the task list may be embedded in the dialogue data collection apparatus 100 or in a crowdsourcing server.

The task presenter 103 may include a display device to output a task to a screen, or a combination of a speech synthesis module to perform speech synthesis of a task in the form of text, and a speaker to output the task in the form of speech generated by the speech synthesis module. Alternatively, the task presenter 103 may also include a transmitter to transmit a task to the client terminal through a network.

In addition, the task presenter 103 notifies the task presented to a worker to the task achievement determiner 104. That is, the task presenter 103 provides information indicating the task (for example, a text describing the task or an index associated with the task (task ID)) to the task achievement determiner 104.

The task achievement determiner 104 receives the response information presented from the response information presenter 102 (or the dialogue management apparatus 200) to a worker, and the task presented from the task presenter 103 to the worker. The task achievement determiner 104 compares the response information to at least one achievement condition predetermined to a certain task, and determines achievement or non-achievement of the task based on whether or not the achievement condition is satisfied.

For example, the achievement condition may include a correct response sentence predetermined relative to a task. In this case, the task achievement determiner 104 may compare a response sentence included in the response information to the correct response sentence, and may determine achievement of the task if they (partially) match with or are similar to each other. The task achievement determiner 104 may calculate a similarity between a response sentence and a corresponding correct response sentence, and may determine whether they are similar to each other based on the comparison between the similarity and a threshold.

If there are multiple response sentence patterns that may satisfy an achievement condition, a plurality of correct response sentences may be determined for the achievement condition. For example, for a task of "Search for an Italian restaurant", the task achievement determiner 104 can determine achievement of the task if one of a response sentence indicating a restaurant search result based on a keyword, "Italian", and a response sentence indicating a restaurant search result based on keywords, "Italian" and "restaurant" is presented.

If response information includes an index associated with a response sentence (response ID), an achievement condition may include a correct index defined by a similar scheme. In this case, the task achievement determiner 104 may compare an index included in the response information to the correct index, and may determine achievement of the task if they match with each other. Similar to the correct response sentence, multiple patterns of correct indices may be determined for an achievement condition.

The achievement condition may include a correct keyword set including at least one correct keyword predetermined relative to a task. In this case, the task achievement determiner 104 may compare at least one keyword extracted from a response sentence included in response information to the correct keyword and determine achievement of the task if they match with or are similar to each other. The task achievement determiner 104 can acquire a keyword by extracting, for example, a noun or a verb from a response sentence. Similar to the correct response sentence and the correct index, multiple patterns of keyword sets may be determined for an achievement condition.

Otherwise, the achievement condition may be combination of the aforementioned correct response sentence (or correct index) and a correct keyword set. For example, in the case where a task is "Search for the weather in the following place: Tokyo", a combination of a correct response sentence, "System will search for the weather", and a correct keyword set including "Tokyo" can be determined as an achievement condition. For such an achievement condition, a number of correct response sentences which are different only in keywords can be replaced with a combination of a correct response sentence corresponding to a common part of the number of correct response sentences and a number of correct keyword sets. Accordingly, the cost for creating a correspondence table described below can be controlled.

A task and an achievement condition corresponding to the task may be managed in the form of a table, for example. The correspondence table may correspond to the aforementioned task list, or may be provided separately from the task list. (for example, within the task achievement determiner 104). The task achievement determiner 104 can derive an achievement condition corresponding to the notified task by referring to the correspondence table. In the correspondence table, a task may be expressed in the form of text or in the form of an index.

Multiple achievement conditions may be determined for a task. For example, if a task includes a plurality of steps such as "Search a product X, confirm the details, and carry out the purchasing procedures", respective achievement conditions can be determined for each step. According to this technique, various task achievement conditions can be designed by a combination of simple correct response sentences. Instead of determining multiple achievement conditions, it is possible to determine whether or not a worker executes a series of steps based on a response sentence (or response index) that should be presented when proceeding to the last step.

In a case where multiple achievement conditions are determined, every time response information is notified, the task achievement determiner 104 compares the response information to each of the achievement conditions that have not been satisfied. The task achievement determiner 104 waits for next response information if an achievement condition that has not been satisfied remains after comparison. On the other hand, the task achievement determiner 104 determines achievement of the task if all of the achievement conditions are satisfied.

The multiple achievement conditions may be set with an order of achievement. In this case, every time response information is notified, the task achievement determiner 104 compares the response information to each of at least one achievement condition that has not been satisfied and has the smallest order of achievement. The task achievement determiner 104 waits for next response information if an achievement condition that has not been satisfied remains after comparison. On the other hand, the task achievement determiner 104 determines achievement of the task if all of the achievement conditions are satisfied.

The task achievement determiner 104 notifies the task achievement notifier 105 of the determination of task achievement. For example, the task achievement determiner 104 provides information indicating the determination of task achievement to the task achievement notifier 105. The task achievement determiner 104 may be installed in the dialogue management apparatus 200 independent from the dialogue data collection apparatus 100. In this case, the task achievement determiner 104 may include a transmitter to transmit through a network information indicating the determination of task achievement to the task achievement notifier 105.

If the task achievement notifier 105 detects that the task achievement determiner 104 determines task achievement, the task achievement notifier 105 notifies a worker of the determination. The notification method may be explicit or implicit.

Specifically, the task achievement notifier 105 may output a sentence or an image indicating the task achievement to a screen, output a sound indicating the task achievement from a speaker, switch a particular Graphical User Interface (GUI) part within a screen from an inactive to active status (or vice versa), transfer a screen to present a next task, or output a particular sound effect from a speaker.

The data collector 106 collects and stores dialogue data including spoken phrases and response information exchanged during an interaction work. The data collector 106 may collect spoken phrases from the spoken phrase acquirer 101, or from the dialogue management apparatus 200. The data collector 106 may collect response information from the response information presenter 102, or from the dialogue management apparatus 200.

The dialogue data collected by the data collector 106 may further include a determination result at the task achievement determiner 104, and an evaluation result of the dialogue system fed back from a worker. The dialogue data collected by the data collector 106 may be integrally managed by an interaction work database (DB) embedded in a crowdsourcing server, for example.

Figure 2:
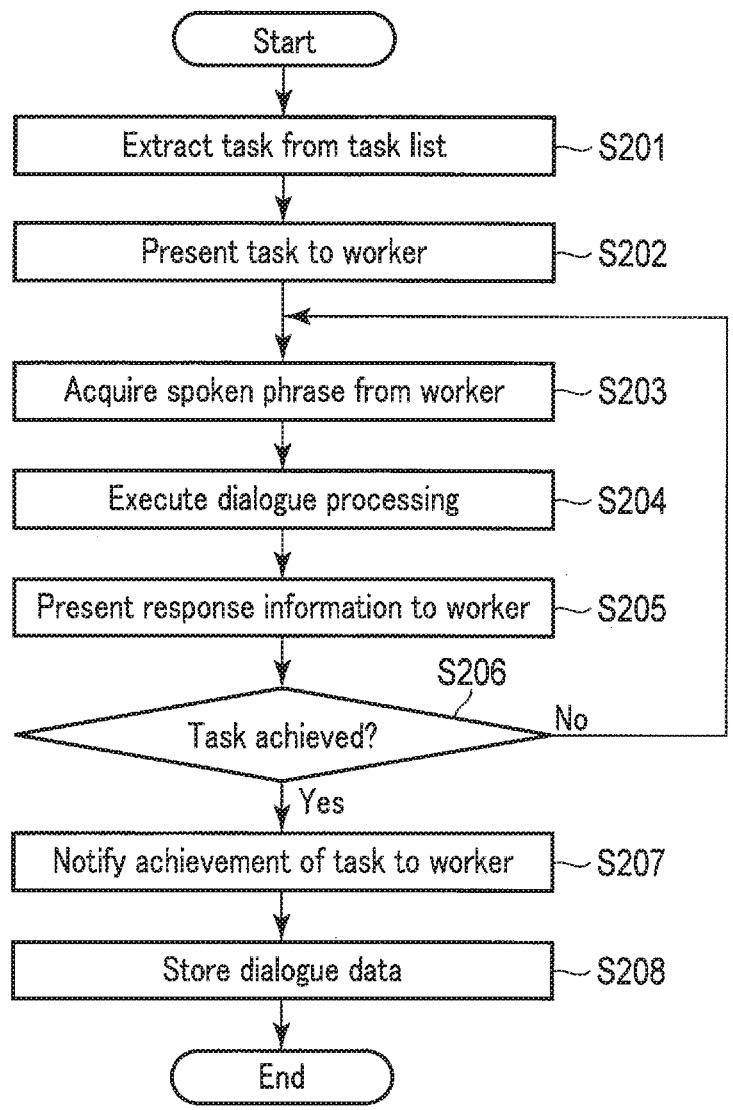
FIG. 2 is a flowchart showing the operation of the dialogue data collection system of FIG. 1.

FIG. 2 shows the operation of the dialogue data collection apparatus 100 performed until a task is achieved. In a case where a worker executes a plurality of tasks, the dialogue data collection apparatus 100 repeats the operation shown in FIG. 2.

The task presenter 103 extracts a task from the plurality of tasks included in the task list (step S201). The task presenter 103 presents the task extracted at step S201 to a worker (step S202).

The worker inputs a spoken phrase suitable to the task presented at step S202. After step S202, the response information presenter 102 may present initial response information indicating initiation of interaction such as "How may I help you?" to prompt input by the worker. The initial response information may be presented by the response information presenter 102 that has received the task presentation from the task presenter 103, or created by the dialogue management apparatus 200 that has received the task presentation from the task presenter 103 and presented by the response information presenter 102. By the technique of the dialogue management apparatus 200 generating the initial response information, the dialogue status can be reset to an initial status every time a task is presented.

At step S203, the spoken phrase acquirer 101 acquires a spoken phrase provided by the worker. The dialogue management apparatus 200 executes dialogue processing based on the spoken phrase acquired at step S203, and generates response information (step S204).

The response information presenter 102 presents to the worker the response information generated at step S204 (step S205). The task achievement determiner 104 compares the response information presented at step S205 to at least one achievement condition predetermined relative to the task presented at step S202, and determines whether or not the task is achieved (step S206). If it is determined that the task is achieved, the processing proceeds to step 207. If not, the processing returns to step S203 after input of a worker's additional spoken phrase.

At step S207, the task achievement notifier 105 explicitly or implicitly notifies to the worker that the task presented at step S202 is achieved. By step S207, the current interaction can be terminated. Then, the worker may execute a next task, input an evaluation of the dialogue system, or terminate the interaction work.

At step S208, the data collector 106 collects dialogue data relating to the current interaction. The dialogue data includes at least a spoken phrase acquired at step S203 and response information generated at step S204 (or presented at step S205). The dialogue data may further include at least one of a determination result of achievement or non-achievement of a task, and an evaluation result of the dialogue system.

The processing at step S208 may be performed in a batch after step S207 as shown in FIG. 2, or may be sporadically performed at a discretionary timing after each information element included in the dialogue data becomes collectible. For example, a spoken phrase is collectible after step S203, response information is collectible after step S204, and a determination result of achievement or non-achievement of a task is collectible after step S206.

Figure 3:
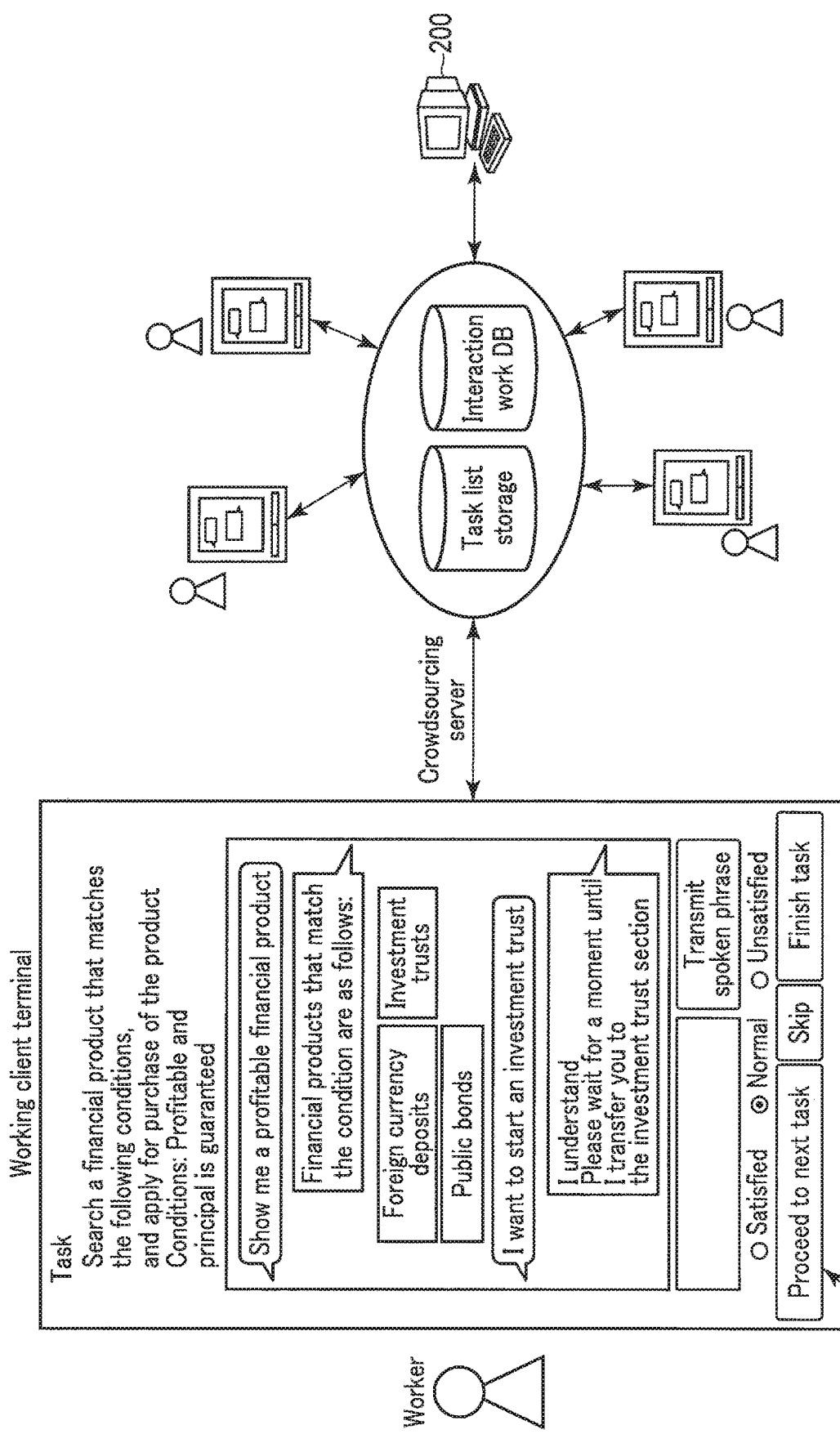
FIG. 3 illustrates an operation example of the dialogue data collection system according to a comparative example.

In the following, advantages of the dialogue data collection system according to the first embodiment will be explained. FIG. 3 illustrates the operation of the dialogue data collection system according to a comparative example. On the other hand, FIGS. 4A and 4B illustrate the operation of the dialogue data collection system according to the first embodiment.

To summarize, the dialogue data collection system according to the comparative example greatly differs from the dialogue data collection system shown in FIG. 1 in that the former does not include functional units corresponding to the task achievement determiner 104 and the task achievement notifier 105. Accordingly, the dialogue data collection system is designed so that a worker can try a next task regardless of whether or not a current task is achieved. On the other hand, the dialogue data collection system according to the present embodiment is designed so that a worker cannot try a next task until it is determined that a current task is achieved.

Figure 4B:
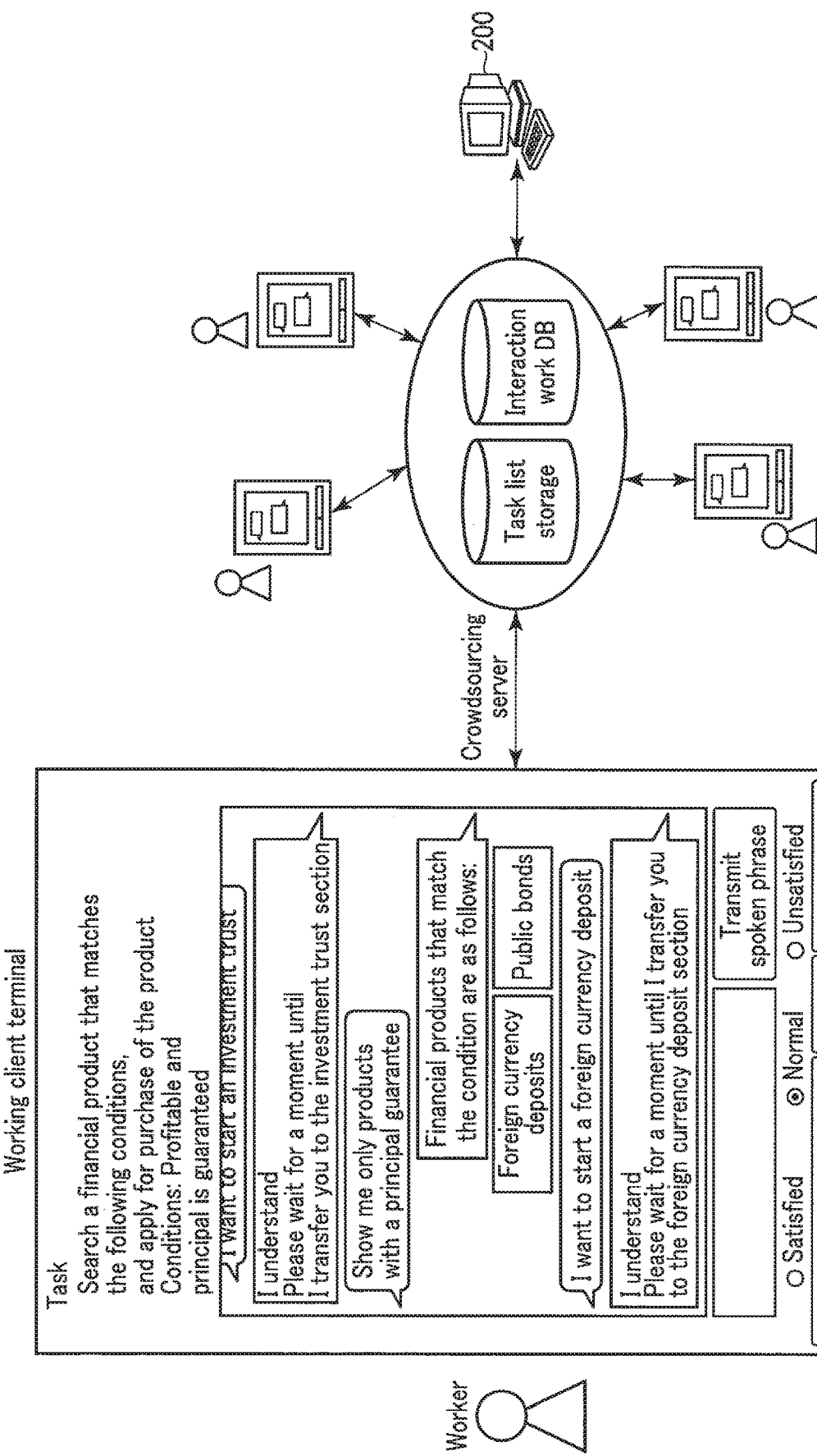
FIG. 4B illustrates an operation example of the dialogue data collection system of FIG. 1.

In examples shown in FIGS. 3, 4A, and 4B, a spoken phrase of a worker is provided from the client terminal to the crowdsourcing server, and to the dialogue management apparatus 200. On the other hand, response information of the dialogue system is provided from the dialogue management apparatus 200 to the crowdsourcing server, and to the client terminal. The task list storage and the interaction work DB are embedded in the crowdsourcing server.

In examples shown in FIGS. 3, 4A, and 4B, a common user interface is used. The user interface is implemented by using a web page that can be browsed simultaneously by a crowd of undefined workers using a client terminal.

The user interface includes a display area for a task, a display area for a worker's spoken phrases and response information of the dialogue system, a text box to display a spoken phrase that is being input, a button to send the spoken phrase stored in the text box to the dialogue management apparatus 200, radio buttons to allow a worker to input a satisfaction degree for the dialogue system, "proceed to next task" button to try a next task, a "skip" button to skip a current task, and a "finish task" button to finish an interaction work.

In the example shown in FIG. 3, a task, "Search for a financial product that matches the following conditions, and apply for purchase of the product. Conditions: Profitable and principal is guaranteed", is presented, and a worker inputs a spoken phrase, "Show me a profitable financial product", to the dialogue data collection system. Based on the spoken phrase, the dialogue management apparatus 200 generates response information, "Financial products that match the conditions are as follows: foreign currency deposits, investment trusts, and public bonds", and the dialogue data collection system presents the response information to the worker.

The worker inputs a spoken phrase, "I want to start an investment trust", to the dialogue data collection system. Based on the spoken phrase, the dialogue management apparatus 200 generates the response information, "I understand. Please wait for a moment until I transfer you to the investment trust section", and the dialogue data collection system presents the response information to the worker.

The investment trust that the worker has applied for purchase is a financial product without a principal guarantee, and the current task is not achieved by the response information presented up to this point. However, as stated above, since the dialogue data collection system cannot determine whether the task is achieved, the worker has to determine the achievement or non-achievement of the task at his own discretion. If the worker selects a button for "proceed to next task" based on an incorrect determination, the dialogue data collection system presents a next task even though suitable dialogue data has not been collected for the current task. In addition, although not illustrated in FIG. 3, the dialogue data collection system according to the comparative example cannot detect a situation where a dishonest worker inputs only a perfunctory spoken phrase not related to the task, and finishes the task.

In contrast, in an example of FIG. 4A, although the same interaction as FIG. 3 is taken place by a worker and the dialogue management apparatus 200, the task achievement determiner 104 does not determine that the task is achieved, and a button for "proceed to next task" and radio buttons for inputting the satisfaction degree remain inactive. Accordingly, the worker can recognize that the task is unachieved.

If the worker notices that the previously applied investment trust is a financial product without a principal guarantee, the worker inputs a spoken phrase "Show me only products with a principal guarantee", to the dialogue data collection system. Based on the spoken phrase, the dialogue management apparatus 200 generates response information, "Financial products that match the conditions are as follows: foreign currency deposits and public bonds", and the dialogue data collection system presents the response information to the worker.

The worker inputs a spoken phrase, "I want to start a foreign currency deposit", to the dialogue data collection system. Based on the spoken phrase, the dialogue management apparatus 200 generates response information, "I understand. Please wait for a moment until I transfer you to the foreign currency deposit section", and the dialogue data collection system presents the response information to the worker.

The task achievement determiner 104 determines that the task is achieved by the response information presented up to this point. The task achievement notifier 105 switches a button for "proceed to next task" and radio buttons for inputting the satisfaction degree to be active, in response to the determination result. Accordingly, the worker can recognize that the task is achieved.

According to the operation examples shown in FIGS. 4A and 4B, it is possible to prevent, for example, a worker erroneously finishing an interaction regarding an unachieved task, a dishonest worker carrying out a perfunctory interaction, and a worker continuing an unnecessary interaction without noticing the achievement of a task. That is, it is possible to collect high quality dialogue data from a crowd of undefined workers.

As explained above, the dialogue data collection system according to the first embodiment automatically determines whether or not a task is achieved based on response information presented by the system, and presents a notification of achievement if the task is achieved. Thus, the dialogue data collection system can efficiently collect high quality dialogue data even without an observer.

If it is determined that a task is unachieved, the task achievement notifier 105 may notify a worker of an unsatisfied achievement condition. The unsatisfied achievement condition may be specified by the task achievement determiner 104, for example. By sending notification of the relevant information, a worker can easily determine a suitable spoken phrase. Specifically, in an example of FIG. 4A, the task achievement notifier 105 may output a sentence such as, "A product with a principal guarantee is not selected", to a screen.

An unsatisfied achievement condition may be notified to a worker at various timings.

For example, in a case where a particular response sentence or index is defined separately from the aforementioned correct response sentence or correct index, if response information from the dialogue management apparatus 200 matches the particular response sentence or index, the task achievement notifier 105 may notify a worker of an unsatisfied achievement condition.

In a case where multiple achievement conditions are defined, if part of the achievement conditions (for example, corresponding to a correct response sentence or correct index) have been satisfied, but remaining conditions (for example, corresponding to a correct keyword set) have not been satisfied, the task achievement notifier 105 may notify a worker of the remaining achievement conditions.

In a case where multiple achievement conditions with an order of achievement are defined, if presented response information satisfies a second achievement condition to be satisfied later (i.e., the corresponding achievement condition among the unsatisfied achievement conditions not having the smallest order of achievement), instead of a first achievement condition to be currently satisfied (i.e., the corresponding achievement condition among the unsatisfied achievement conditions having the smallest order of achievement), the task achievement notifier 105 may notify a worker of the first achievement condition.

In a case where a worker attempts to proceed to a next task or input a satisfaction degree even though the current task is not achieved, the task achievement notifier 105 may notify the worker of unsatisfied achievement conditions.

Second Embodiment

The dialogue data collection system according to the first embodiment can automatically determine the achievement or non-achievement of a task. However, if the performance of the dialogue system is low, or a worker's spoken phrase is unclear, there may be a problem that a task cannot be achieved, or that it takes a considerable time to achieve the task. When outsourcing interaction work to an undefined public through crowdsourcing, it is desirable that each task is achieved for approximately the same amount of time.

Figure 5:
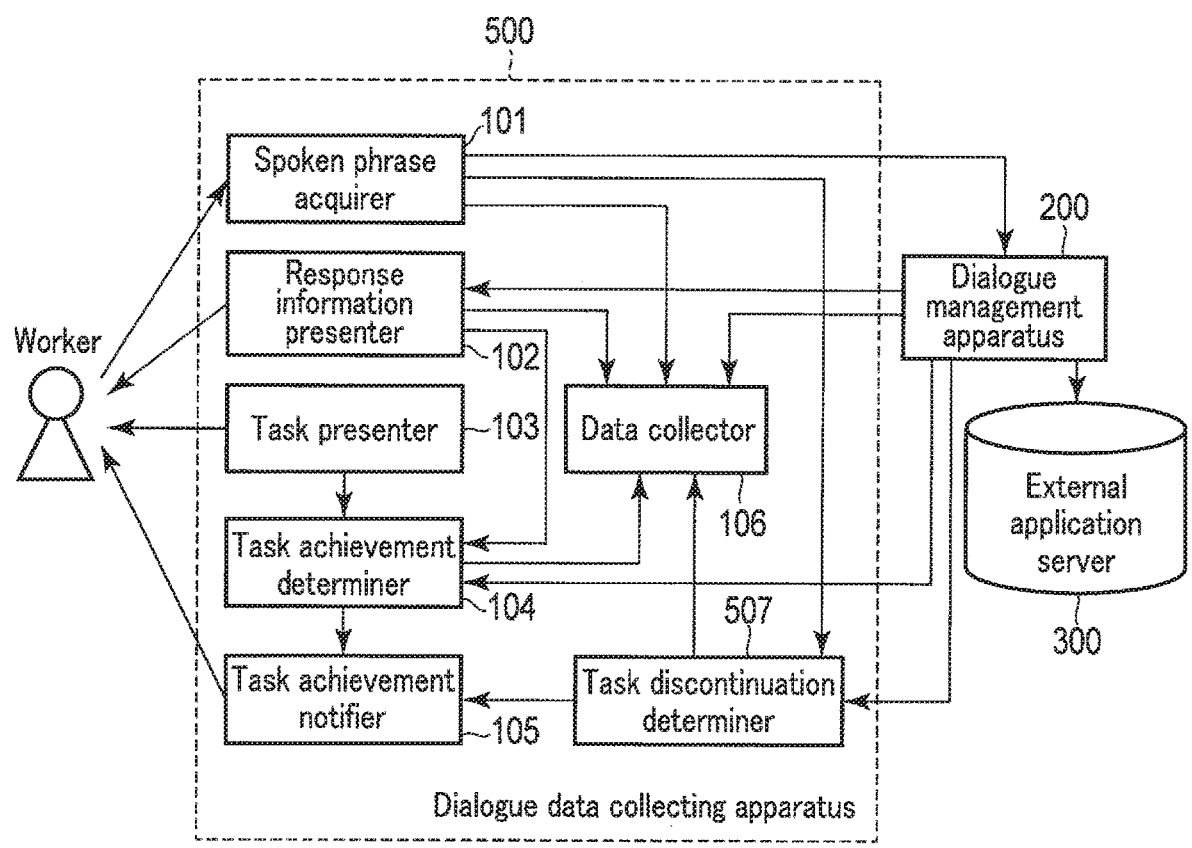
FIG. 5 is a block diagram showing a dialogue data collection system according to the second embodiment.

As shown in FIG. 5, the dialogue data collection system according to the second embodiment includes a dialogue data collection apparatus 500, a dialogue management apparatus 200, and an external application server 300. The dialogue data collection apparatus 500 includes a task discontinuation determiner 507, and differs from the dialogue data collection apparatus 100 of FIG. 1 in this point.

The task discontinuation determiner 507 determines whether or not to discontinue a current task. When the task discontinuation determiner 507 determines discontinuation of the task, the task achievement notifier 105 notifies a worker that the task will be discontinued.

A functional unit corresponding to the task discontinuation determiner 507 may be embedded in the dialogue management apparatus 200. When discontinuation of a task is determined, the dialogue management apparatus 200 may provide response information indicating the discontinuation of the task, a response index, or other special information to the dialogue data collection apparatus 500. The task achievement notifier 105 can determine discontinuation of a task based on information received by the dialogue management apparatus 200.

Specifically, the task discontinuation determiner 507 may determine whether or not to discontinue a task based on the number of times that the spoken phrase acquirer 101 has acquired a spoken phrase, the number of times that the spoken phrase acquirer 101 has re-acquired the same spoken phrase, the number of times that the dialogue management apparatus 200 has re-transferred the dialogue status to the same status, or the amount of time elapsed from the presentation of the current task. For example, the task discontinuation determiner 507 may determine discontinuation of a task if these parameters are equal to or greater than a threshold. Otherwise, the task discontinuation determiner 507 may determine discontinuation of a task if the spoken phrase acquirer 101 acquires a spoken phrase indicating a request of discontinuing a task, such as "Enough", "End", etc.

The data collector 106 may collect and store information indicating whether or not a task is discontinued as dialogue data. Such information can be used for filtering the dialogue data in accordance with demands (eliminating or extracting corresponding data). In addition, the data collector 106 may collect and store information indicating a cause of discontinuation of a task (discontinued by a worker's request, or discontinued by determination of the dialogue data collection system) as dialogue data.

Third Embodiment

Figure 6:
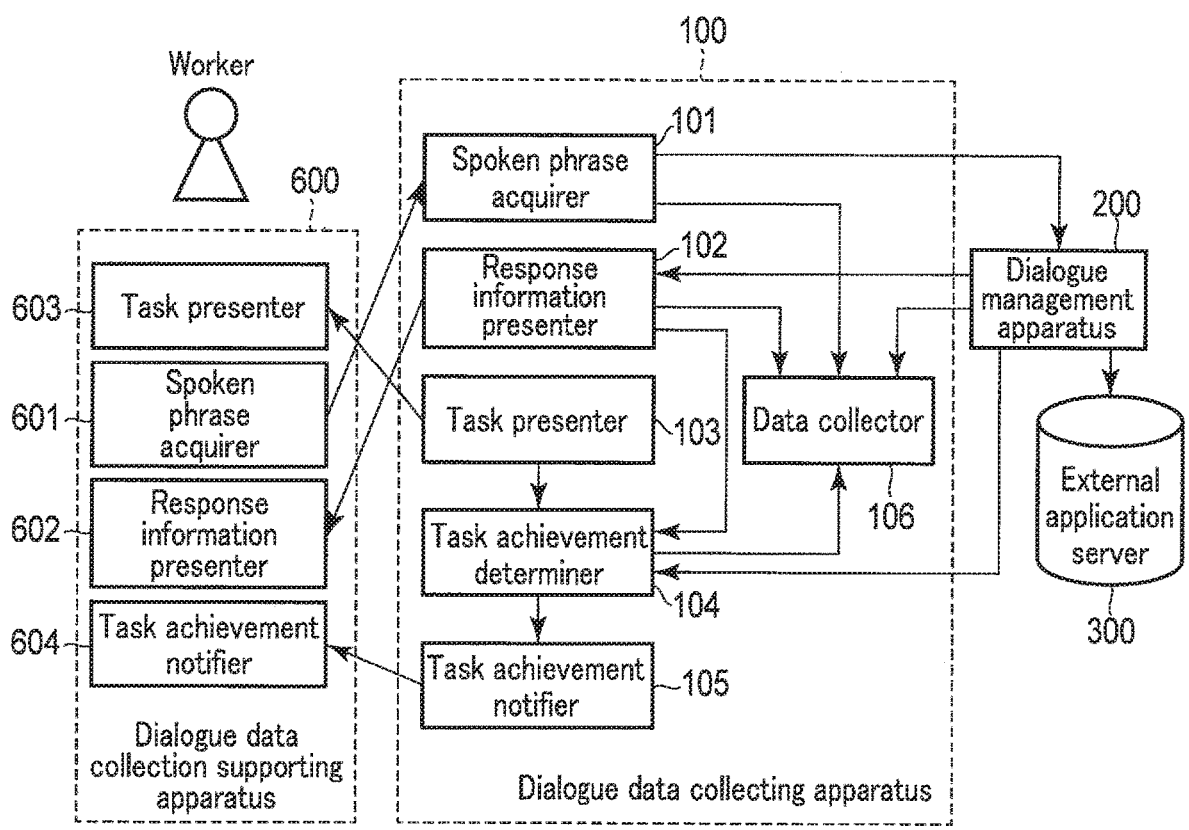
FIG. 6 is a block diagram showing a dialogue data collection system according to the third embodiment.

In a case where the dialogue data collection apparatus 100 is embedded in a crowdsourcing server, a worker operates a dialogue data collection supporting apparatus 600 (corresponding to a client terminal) as shown in FIG. 6, for example, to execute interaction with a dialogue system.

The dialogue data collection apparatus 600 shown in FIG. 6 includes a spoken phrase acquirer 601, a response information presenter 602, a task presenter 603, and a task achievement notifier 604.

The spoken phrase acquirer 601 acquires a spoken phrase of a worker in the form of text. The spoken phrase acquirer 601 may include an input device to receive a text input from a worker, or a combination of a microphone to receive a voice input from a worker and an automatic speech recognition module to perform speech recognition of a voice received by the microphone.

The spoken phrase acquirer 601 provides the acquired spoken phrase to the dialogue data collection apparatus 100 (specifically, the spoken phrase acquirer 101). The spoken phrase acquirer 601 may include a transmitter to transmit a spoken phrase to the dialogue management apparatus 100 through a network.

The response information presenter 602 receives response information from the dialogue data collection apparatus 100 (specifically, the response information presenter 102). The response information presenter 602 may include a receiver to receive through a network response information of the dialogue data collection apparatus 100.

The response information presenter 602 presents response information to a worker. The response information presenter 602 may present the response information with or without processing it. The response information presenter 602 may include a display device to output response information to a screen, or a combination of a speech synthesis module to perform speech synthesis of response information in the form of text, and a speaker to output the response information in the form of speech generated by the speech synthesis module.

The task presenter 603 receives a task from the dialogue data collection apparatus 100 (specifically, the task presenter 103). The task presenter 603 may include a receiver to receive through a network a task from the dialogue data collection apparatus 100.

The task presenter 603 presents the received task to a worker. The task presenter 603 may include a display device to output a task to a screen, or a combination of a speech synthesis module to perform speech synthesis of a task in the form of text, and a speaker to output the task in the form of speech generated by the speech synthesis module.

Upon reception of a notification of achievement from the dialogue data collection apparatus 100 (specifically, the task achievement determiner 104), the task achievement notifier 604 notifies a worker of achievement of a task. The notification method may be explicit or implicit.

Specifically, the task achievement notifier 604 may output a sentence or an image indicating the task achievement to a screen, output a sound indicating the task achievement from a speaker, switch a particular GUI part within a screen from inactive to active status (or vice versa), transfer a screen to present a next task, or output a particular sound effect from a speaker.

As explained above, the dialogue data collection system according to the third embodiment in which the dialogue data collection apparatus is embedded in a crowdsourcing server instead of in a client terminal, shares the task achievement determiner. Therefore, the dialogue data collection system can simplify a client terminal.

At least a part of the processing in the above-described embodiments can be implemented using a general-purpose computer as basic hardware. A program implementing the processing in each of the above-described embodiments may be stored in a computer readable storage medium. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A dialogue data collection system comprising:
a client terminal; and
a dialogue management apparatus,
wherein the client terminal comprises:
   a computer;
   an input device including at least one of a keyboard, a software keyboard, a mouse, and a microphone; and
   a display;
   wherein the computer is configured to:
   display, on the display, a graphical user interface screen;
   present, in the graphical user interface screen, a current task to be completed by a worker, the current task being a task which requires the worker to engage in dialogue to complete and which includes a prompt that is presented to the worker before a beginning of the dialogue;
   display, in the graphical user interface screen, a graphical user interface button that is operable by the worker to advance to a next task, wherein the computer is configured to set the graphical user interface button in an inactive state before completion of the current task, the graphical user interface button being inoperable to advance to the next task while the graphical user interface button is in the inactive state, wherein the computer is configured to set a display state of the graphical user interface button to a first display state to visually show that the graphical user interface button is in the inactive state;
   acquire, via the input device, a spoken phrase from the worker as a response to the prompt, and provide the spoken phrase as text data to the dialogue management apparatus, wherein the computer acquires the spoken phrase which is input as text input by the worker using at least one of the keyboard, software keyboard, and mouse, or which is input as a voice input by the worker via the microphone, the computer performing speech recognition on the voice input using an automatic speech recognition (ASR) module to convert the spoken phrase to text data;
   receive, from the dialogue management apparatus, response information that the dialogue management apparatus generates by advancing a dialogue status based on the spoken phrase provided thereto, and present the received response information to the worker in the graphical user interface screen;
   compare, each time the response information is received, the received response information to at least one achievement condition predetermined relative to the current task, and determine whether the current task has been achieved based on whether or not the at least one achievement condition is satisfied;
   in response to a determination that the current task has been achieved, switch the graphical user interface button from the inactive state to an active state in which the graphical user interface is operable by the worker to advance to the next task, and change the display state of the graphical user interface button to a second display state to visually show that the graphical user interface button is in the active state; and
   collect dialogue data including the spoken phrase and the response information.

2. The system according to claim 1, wherein the dialogue data further includes a determination result indicating achievement or non-achievement of the current task.

3. The system according to claim 1, wherein the dialogue data further includes an evaluation result fed back from the worker.

4. The system according to claim 1, wherein:
the client terminal is operable by the worker;
the client terminal extracts the current task from a task list managed by a server connected to the client terminal via a network; and
the client terminal notifies the worker that the next task is available when achievement of the current task is determined, the client terminal notifying the worker that the next task is available at least by switching the graphical user interface button from the inactive state to the active state and changing the display state of the graphical user interface button from the first display state to the second display state.

5. The system according to claim 4, wherein the client terminal stores the dialogue data in an interaction work database embedded in the server.

6. The system according to claim 1, wherein in a case where a total number of the at least one achievement condition is at least two achievement conditions, the client terminal compares the received response information to an unsatisfied achievement condition, in response to reception of the response information from the dialogue management apparatus, and determines achievement of the task if all the achievement conditions are satisfied.

7. The system according to claim 1, wherein in a case where a total number of the at least one achievement condition is at least two achievement conditions, and an order of achievement is set to the achievement conditions, the client terminal compares the received response information to an achievement condition which has a smallest order of achievement among at least one unsatisfied achievement conditions, in response to reception of the response information from the dialogue management apparatus, and determines achievement of the task if all the achievement conditions are satisfied.

8. The system according to claim 1, wherein the client terminal specifies an unsatisfied achievement condition, and notifies the worker of the unsatisfied achievement condition at least by maintaining the graphical user interface button in the inactive state and the first display state.

9. The system according to claim 1, wherein the client terminal is further configured to:
   determine whether not to discontinue the current task based on at least one of a number of times of acquiring the spoken phrase, a number of times of re-acquiring an identical spoken phrase, a number of times of re-transferring the dialogue status to an identical status, and an amount of time elapsed from presentation of the current task, and
   notify the worker of discontinuation of the current task.

10. The system according to claim 1, wherein the client terminal is further configured to:
    determine discontinuation of the task if a spoken phrase indicating a request of discontinuing the task is received, and
    notify the worker of discontinuation of the current task.

11. The system according to claim 1, comprising a plurality of the client terminals, each of the plurality of the client terminals being operable by a respective worker.

* * * * *